United States Patent
Nosaka

(10) Patent No.: US 10,078,471 B2
(45) Date of Patent: Sep. 18, 2018

(54) MEMORY DEVICE THAT SORTS ACCESS COMMANDS TO A NONVOLATILE SEMICONDUCTOR MEMORY UNIT THEREOF

(71) Applicant: TOSHIBA MEMORY CORPORATION, Tokyo (JP)

(72) Inventor: Yuusuke Nosaka, Inagi Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 21 days.

(21) Appl. No.: 15/063,333

(22) Filed: Mar. 7, 2016

(65) Prior Publication Data

US 2016/0342365 A1 Nov. 24, 2016

Related U.S. Application Data

(60) Provisional application No. 62/163,774, filed on May 19, 2015.

(51) Int. Cl.
*G06F 3/06* (2006.01)

(52) U.S. Cl.
CPC .......... *G06F 3/0659* (2013.01); *G06F 3/0625* (2013.01); *G06F 3/0679* (2013.01); *Y02B 60/1246* (2013.01); *Y02D 10/154* (2018.01)

(58) Field of Classification Search
CPC ..... G06F 3/0659; G06F 3/0625; G06F 3/0679
See application file for complete search history.

(56) References Cited

U.S. PATENT DOCUMENTS

| | | | |
|---|---|---|---|
| 6,170,042 B1 | 1/2001 | Gaertner et al. | |
| 7,293,136 B1 | 11/2007 | More et al. | |
| 8,271,749 B2* | 9/2012 | Yamaguchi | G06F 3/061 |
| | | | 711/154 |
| 2009/0248917 A1 | 10/2009 | Kalos et al. | |
| 2010/0100645 A1 | 4/2010 | Yamaguchi et al. | |
| 2011/0179240 A1* | 7/2011 | Sukonik | G06F 13/18 |
| | | | 711/158 |
| 2014/0355619 A1* | 12/2014 | Fukuda | H04J 3/242 |
| | | | 370/428 |

* cited by examiner

*Primary Examiner* — Reginald G Bragdon
*Assistant Examiner* — Edward Wang
(74) *Attorney, Agent, or Firm* — Patterson & Sheridan, LLP

(57) ABSTRACT

A memory device includes a nonvolatile memory unit and a memory controller. The memory controller is configured to generate a plurality of commands in accordance with requests received from a host and store the commands in a buffer, set a priority level to each of the commands based on contents thereof, and transfer the commands having a first priority level from the buffer to the nonvolatile memory unit during a first time period, and the commands having a second priority level lower than the first priority level from the buffer to the nonvolatile memory unit during a second time period. The first time period and the second time period are fixed recurring time periods, and the second time period begins after expiration of the first time period.

18 Claims, 5 Drawing Sheets

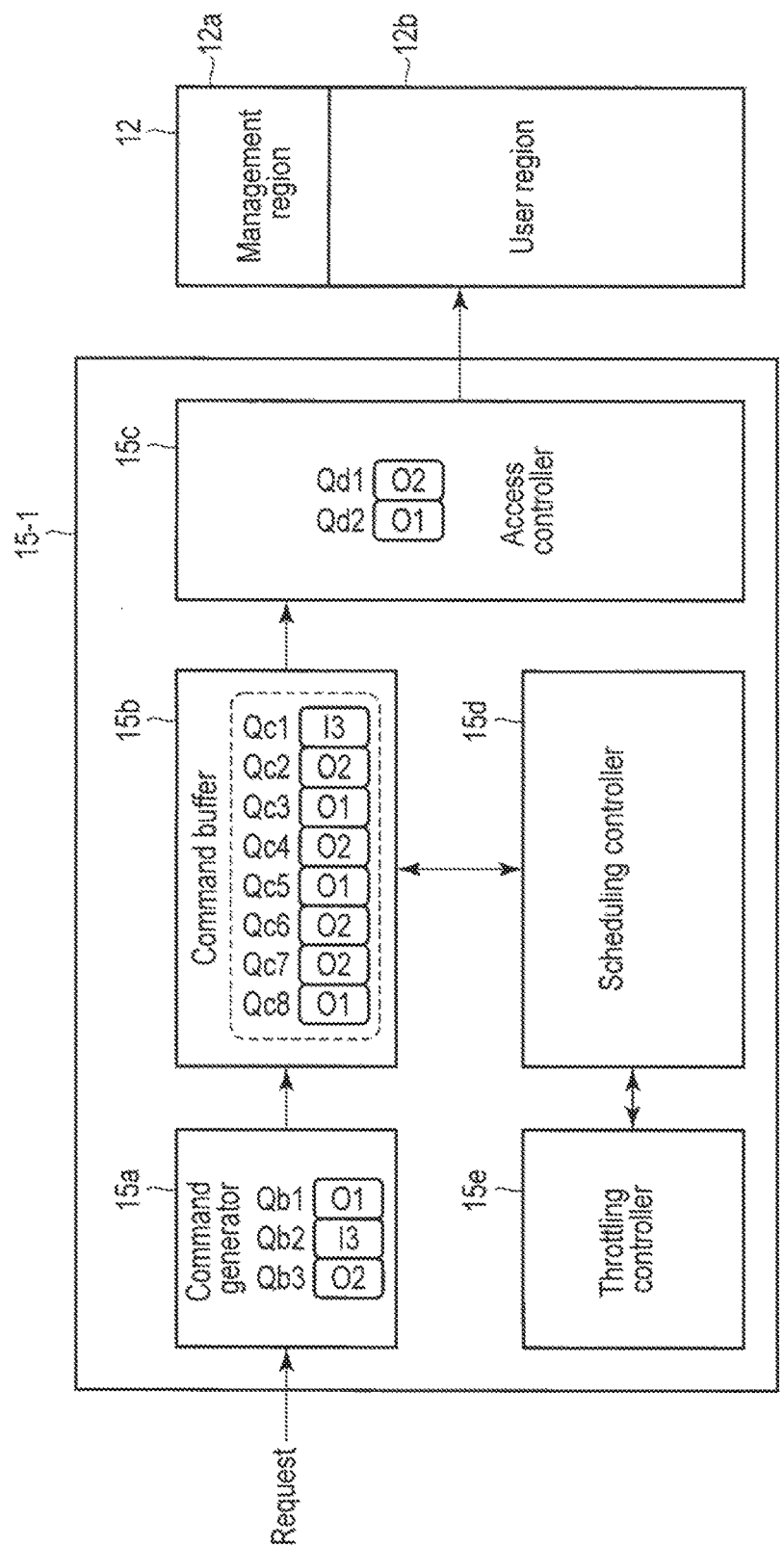
F I G. 2

| Classification | Priority | Order | Assignment of schedule |
|---|---|---|---|
| User write | 3 | In-order | T2 |
| Table write | 3 | In-order | T2 |
| User read | 2 | Out-of order | T1 |
| Table read | 1 | Out-of order | T1 |

FIG. 3

| Assignment of schedule | Number of commands |
|---|---|
| T1 | 3 |
| T2 | 1 |
| T4 | 4 |

FIG. 4

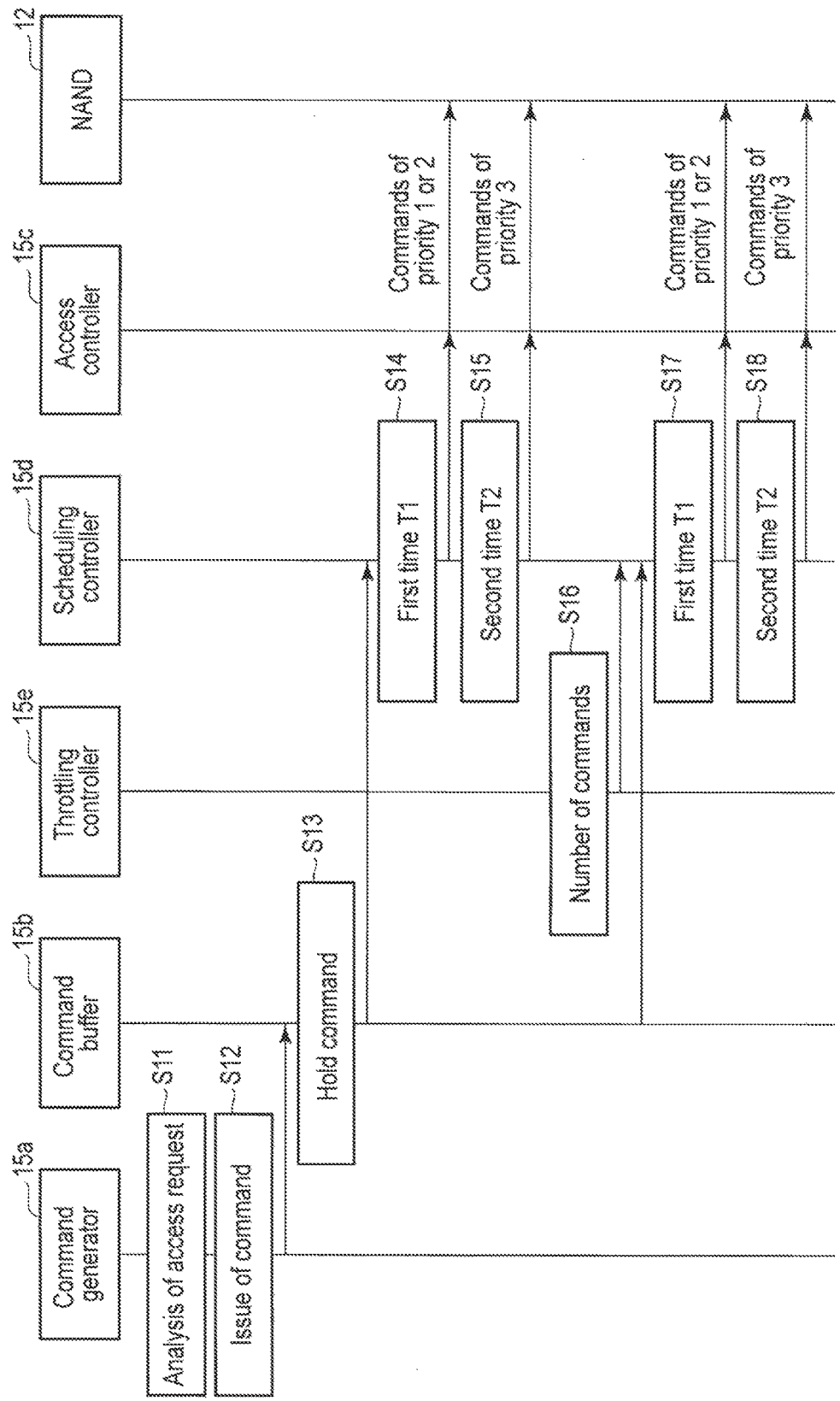
F I G. 5

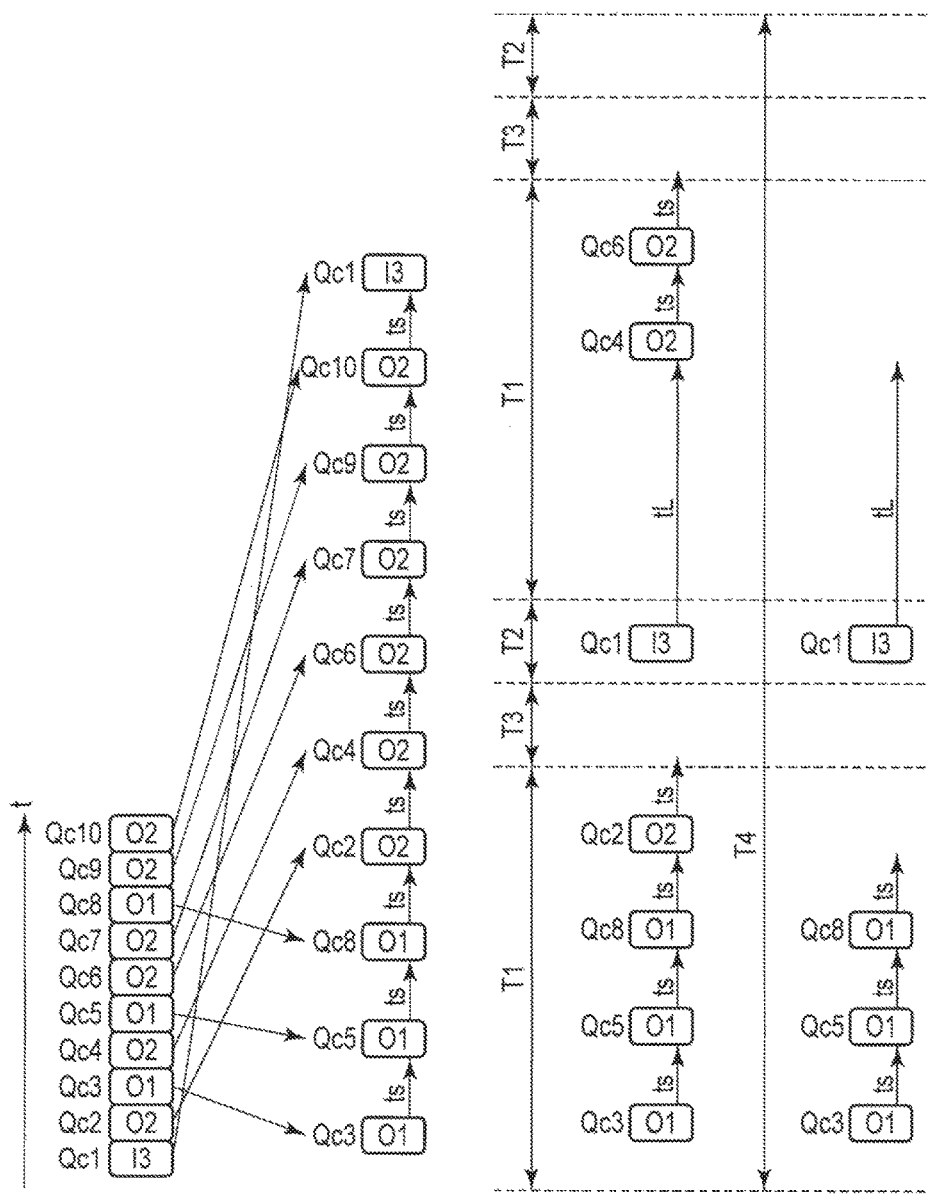

MEMORY DEVICE THAT SORTS ACCESS COMMANDS TO A NONVOLATILE SEMICONDUCTOR MEMORY UNIT THEREOF

CROSS-REFERENCE TO RELATED APPLICATION

This application is based upon and claims the benefit of priority from U.S. Provisional Patent Application No. 62/163,774, filed May 19, 2015, the entire contents of which are incorporated herein by reference.

FIELD

Embodiments described herein relate generally to a memory system including a solid-state drive (SSD) in which, for example, a nonvolatile semiconductor memory unit is mounted.

BACKGROUND

An SSD memory system includes, for example, a NAND flash memory as a nonvolatile semiconductor memory. The NAND flash memory in the SSD is accessed based on various kinds of commands issued according to access requests from an initiator. These commands have a certain priority order and are executed according to the priority order.

BRIEF DESCRIPTION OF THE DRAWINGS

FIG. 2 is a block diagram of a controller and a NAND of the memory system illustrated in FIG. 1.

FIG. 3 illustrates a relationship among classification of commands and setting of each command.

FIG. 4 illustrates the number of commands restricted by a throttling controller.

FIG. 5 is a sequence chart showing an example of an operation carried out by the controller illustrated in FIG. 2.

FIGS. 6A, 6B, 6C, and 6D are each a time chart illustrating an order of commands issued or transferred.

DETAILED DESCRIPTION

Figure 1:
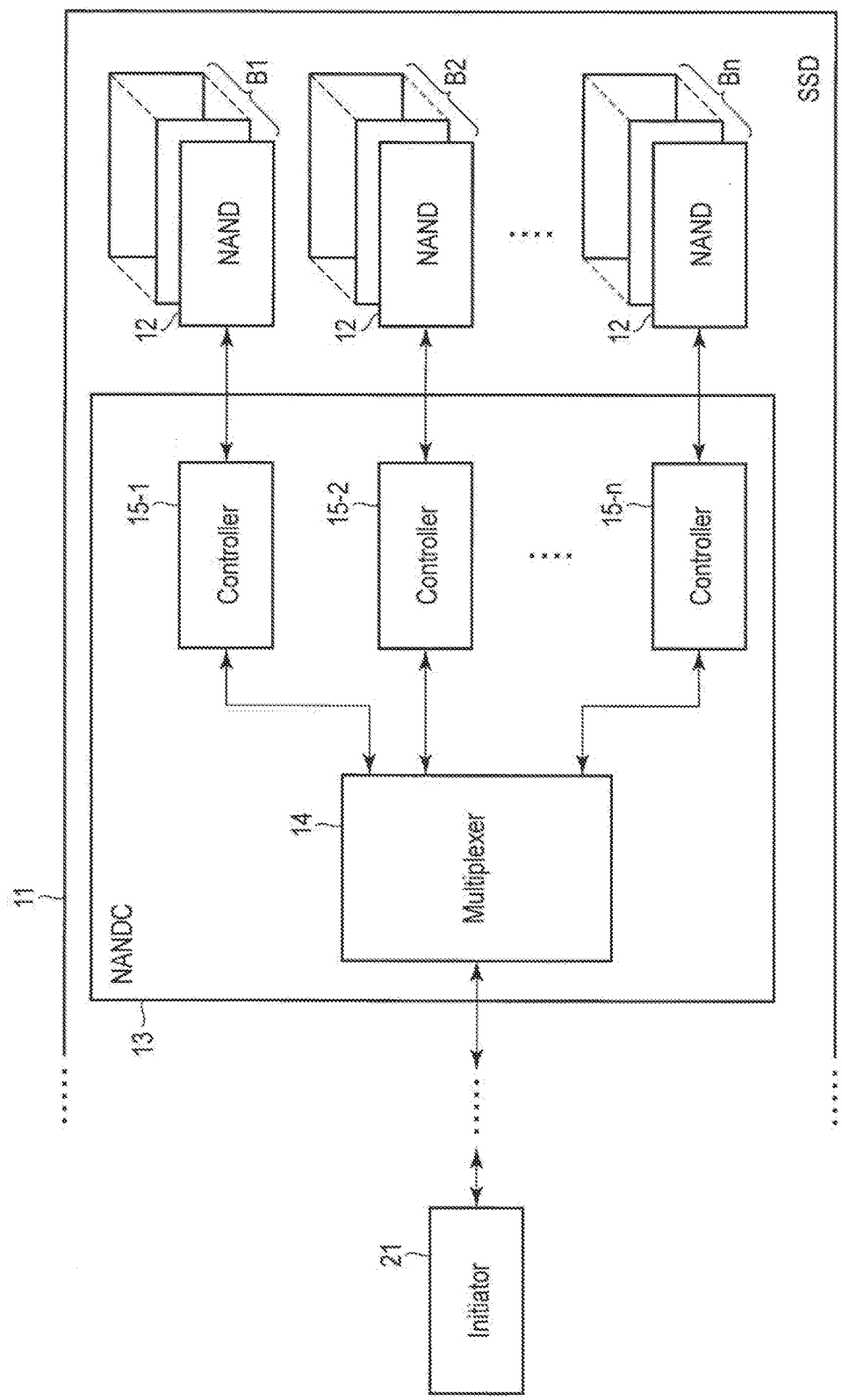
FIG. 1 is a block diagram schematically showing a part of a memory system according to an embodiment.

In general, according to an embodiment, a memory device includes a nonvolatile memory unit and a memory controller. The memory controller is configured to generate a plurality of commands in accordance with requests received from a host and store the commands in a buffer, set a priority level to each of the commands based on contents thereof, and transfer the commands having a first priority level from the buffer to the nonvolatile memory unit during a first time period, and the commands having a second priority level lower than the first priority level from the buffer to the nonvolatile memory unit during a second time period. The first time period and the second time period are fixed recurring time periods, and the second time period begins after expiration of the first time period.

Embodiments will be described with reference to drawings. In the drawings, the same structural elements will be designated by the same reference symbols.

FIG. 1 shows a part of an SSD 11 according to an embodiment. The SSD 11 is coupled to an initiator 21 via an interface (not shown) such as Serial Attached SCSI (SAS). The initiator 21 is included in a server such as a host device. The initiator 21 is configured to issue various kinds of access requests to the SSD 11 as a target device and to receive a response to each of the access requests from the SSD 11.

The SSD 11 includes the banks B1, B2, . . . , Bn each including a plurality of memory cell arrays (referred to as NANDs hereinafter) 12 of NAND flash memories. The banks B1, B2, . . . , Bn are connected to a NAND memory controller (referred to as NANDC hereafter) 13, respectively.

The NANDC 13 is configured to, upon reception of various types of access requests such as a read request, a write request, and an erase request, which are issued by the initiator 21, issue a read command, a write command, an erase command, and the like for accessing the NAND 12 based on these requests, and transmit these commands to the NANDs 12 in the banks B1, B2, . . . , Bn.

The NANDC 13 includes, for example, a multiplexer 14 and controllers 15-1 to 15-$n$. The multiplexer 14 is connected to the controllers 15-1 to 15-$n$. The multiplexer 14 is configured to transfer various types of access requests, data, etc., issued by the initiator 21 to the controllers 15-1 to 15-$n$, and transfer data, response signals, etc., read data from the NANDs 12 in the banks B1, B2, . . . , Bn to the initiator 21 through the controllers 15-1 to 15-$n$. The controllers 15-1 to 15-$n$ have the same structure. Therefore, the structure of the controller 15-1 will be representatively described.

FIG. 2 shows an example of the controller 15-1. The controller 15-1 includes a command generator 15$a$, a command buffer 15$b$, an access controller 15$c$, a scheduling controller 15$d$, and a throttling controller 15$e$. The configuration of the controller 15-1 is not limited to this example, but may be modified according to the configuration of, for example, the firmware in the SSD 11.

The command generator 15$a$ is configured to receive various types of access requests issued by the initiator 21, analyze the received access requests to identify the classification of command, the access regions, and the like, and issue a command for accessing the NAND 12. This command contains a read command, a write command, and an erase command, for example. Further, the command generator 15$a$ is configured to add priority data and order data to the command according to the access region. The priority data the order data and the like are set in advance by, for example, the initiator 21 (host device) and are held in the controller 15-1, or, for example, a register (not shown) of the NANDC 13. The command generator 15$a$ is configured to add the priority and order data held in, for example, the register to the command issued by the initiator 21 according to the access region of the command. Here, the priority data, and the order data, etc., held in the register can be changed by the initiator 21.

FIG. 3 shows a relationship between the classification of commands, the priority data, the order data, and the assignment of schedule. In FIG. 3, the classification of command includes, for example, a read command and a write command. The read command further includes, for example, two types depending on the access region of the NAND 12.

As shown in FIG. 2, the NAND 12 includes, for example, a management region 12$a$ and a user region 12$b$. For example, management data including address translation table, etc., used by the system is stored in the management region 12$a$, and user data is stored in the user region 12$b$.

For example, the commands to access the management region 12$a$ include a read command (table read) and a write command (table write), whereas the commands to access the user region 12*b* include a read command (user read) and a write command (user write).

In the example shown in FIG. 3, a read command (table read) to access the management region 12*a* has the highest priority, for example, "1", and contains, as the order data, "out-of-order", which indicates that the read command should be executed disregarding the order data.

A read command (user read) to access the user region 12*b* has the next highest priority to the read command to access the management region 12*a*, i.e., "2", and contains "out-of-order" as the order data.

A write command to access the management region 12*a* (table write) and a write command to access the user region 12*b* (user write) have a priority lower than those of the read commands, i.e., "3", and contains, as the order data, "in-order", which indicates that a write command should be executed in the order according to the order data.

The assignment of schedule indicates the timing during which a command is executed. More specifically, the assignment of schedule shows the relationship between a first time T1 and a second time T2 controlled by the scheduling controller 15*d*, and commands executable at the first time T1 and the second time T2. That is, the read commands having priorities of "1" and "2" can be executed during the first time T1, and the write command having a priority of "3" can be executed during the second time T2.

Here, the priority data, the order data, and the assignment of schedule need not be added to a command, but it suffices if the corresponding relationship between a command and its priority data, order data, and the assignment of schedule can be known. Therefore, the priority data, the order data, and the assignment of schedule may be managed separately from the command.

Further, in the description above, the read command (table read) to access the management region 12*a* is set as the command with the highest priority, and the write command (table write) and the write command (user write) to access the management region 12*a* and the user region 12*b*, respectively, are sent as the command with the lowest priority. However, the priority is not limited to this order, and can be modified as needed by the system.

In FIG. 2, a command Qb1 generated by the command generator 15*a* has a priority of "1" and indicates "out-of-order", a command Qb2 has a priority of "3" and indicates "in-order", and a command Qb3 has a priority of "2" and indicates "out-of-order".

As shown in FIG. 2, a command issued by the command generator 15*a* is supplied together with the priority data and the order data to the command buffer 15*b*. The command buffer 15*b* is configured to hold two or more commands supplied from the command generator 15*a* sequentially, and form a queue of the commands. The commands held in the command buffer 15*b* are supplied to the access controller 15*c* according to the priority data and the order data set to each command. That is, the commands are supplied, in the order of priority from the highest to the lowest, to the access controller 15*c*.

The scheduling controller 15*d* is connected to the command buffer 15*b* and configured to control the order of the commands to be supplied from the command buffer 15*b* to the access controller 15*c* according with a certain time interval. That is, the scheduling controller 15*d* is configured to control transmission of commands according to the first time T1, the second time T2, and the third time T3. The first time T1 is longer than the second time T2 and the third time T3, and the second time T2 and the third time T3 are set to be equal, for example. But the second time T2 and the third time T3 may be different.

The first time T1 is a period during which commands with higher priorities in the command buffer 15*b* are transferred to the NAND 12 through the access controller 15*c* in the order of priority first and time from the issuance second. Further, the first time T1 is also a period during which commands with low priorities are executed.

The second time T2 is a period during which commands in the command buffer 15*b* which are defined as specific commands, for example, commands with low priorities, are transferred to the NAND 12 through the access controller 15*c* and executed.

The third time T3 is a period between the first time T1 and the second time T2, during which the commands in the command buffer 15*b* are not transferred to the access controller 15*c*. That is, the third time T3 is a period provided, such that a command transferred in the first time T1 can be completed before the second time T2.

When there is no command with a low priority to be transferred during the second time T2, it is also possible to transmit a command with a high priority during the second time T2.

Specifically, the scheduling controller 15*d* is configured to supply, during the first time T1, commands having a priority of "1", out of those held in the command buffer 15*b*, to the access controller 15*c* in the order of issuance, and then to supply commands having a priority of "2" to the access controller 15*c*. Since the order data of a command having a high priority is "out-of-order", those having high priorities can be supplied to the access controller 15*c* regardless of the commands having low priorities that have order data of "in-order".

After the first time T1 and the third time T3 have elapsed, during the second time T2, the scheduling controller 15*d* transfers a specific command, that is, a command with a priority of "3" in the command buffer 15*b* and oldest of commands with the priority of "3", to the access controller 15*c*.

The throttling controller 15*e* shown in FIG. 2 is connected to the scheduling controller 15*d* and configured to limit the number of commands which can be transferred to the access controller 15*c* in unit time. For example, the SSD 11 is set to have maximum electric power consumption, and therefore the number of commands which can be executed within a time must to be limited. Therefore, the throttling controller 15*e* is configured to limit the number of commands which can be executed within a time.

Specifically, the throttling controller 15*e* controls the number of commands which can be transferred from the command buffer 15*b* to the access controller 15*c*, for example, within a fourth time T4. The fourth time T4 is set longer than the sum total of the first time T1, the second time T2, and the third time T3, controlled by the scheduling controller 15*d*, and is set to, for example, (T1+T2+T3)×2. The fourth time T4 is not limited to this, and can be modified based on the maximum allowable electric power consumption.

FIG. 4 shows an example of the number of commands controlled by the throttling controller 15*e*. FIG. 4 shows that the number of commands which can be executed within the fourth time T4 is four in total. Further, within the first time T1 in the fourth time T4, the number of commands which can be transferred is set to, for example, three, and the number of commands which can be transferred during the second time T2 is set to, for example, one. Thus, the total number of commands which can be transferred within the fourth time T4 is limited to four. Here, the number of transferable commands is not limited to four, and can be modified.

(Operation)

With reference to FIG. 5 and FIGS. 6A-6D, the operation of the controller 15-1 shown in FIG. 2 will be described.

In FIGS. 6B-6D, time is indicates execution time of a read command, and time tL indicates execution time of a write command.

As shown in FIG. 5, the command generator 15a receives an access request issued by the initiator 21 and analyzes the contents of the access request (S11). More specifically, it is determined whether the access request is a read access or a write access to NAND 12, and further distinguished whether it is an access to the management region 12a of the NAND 12 or the user region 12b of the NAND 12, based on, for example, the logical address of the access request. Based on the result of the analysis, a command is issued (S12). The priority data and the order data described above are added to this command.

The commands generated by the command generator 15a are supplied to the command buffer 15b to be held therein (S13).

FIG. 6A shows commands held in the command buffer 15b as the time t elapses since a command Qc1 was issued. The oldest command within the command buffer 15b is the command Qc1, and the newest command is a command Qc10. Thus, the command buffer 15b sequentially holds commands issued by the command generator 15a.

FIG. 6B shows a comparative example of an operation when the scheduling controller 15d and the throttling controller 15e are not provided. In this case, commands held in the command buffer 15b are supplied to the access controller 15c in the order only according to the priority added to each command. More specifically, the commands are transferred in accordance with the priority data first, and the time from the issuance second. That is, as shown in FIG. 6B, commands Qc3, Qc5, and Qc8 are transferred to the sequential access controller 15c. Then, commands having the next highest priority are transferred next from the oldest one. That is, as shown in FIG. 6B, command Qc2, Qc4, Qc6, Qc7, Qc9, and Qc10 are transferred sequentially to the sequential access controller 15c. After that, command Qc1 with the lowest priority is transferred to the access controller 15c. Thus, command Qc1 with low priority is kept in the command buffer 15b for a long time.

The scheduling controller 15d transfers, during the first time T1, commands having a priority of "1" or "2" sequentially to the access controller 15c and then to the NAND 12, to be executed (S14).

Next, during the second time T2, specific commands having a priority of "3" are transferred to the access controller 15c and then to the NAND 12, to be executed (S15).

FIG. 6C shows an example of an operation in which the scheduling controller 15d (not the throttling controller 15e) is used. As shown in FIG. 6C, the scheduling controller 15d, during the first time T1, transfers commands Qc3, Qc5, and Qc8 having a priority of "1" in the command buffer 15b to the access controller 15c in the order of the time from the issuance, and then command Qc2 having a priority of "2" to the access controller 15c. Then, the commands Qc3, Qc5, Qc8, and Qc2 are supplied from the access controller 15c to the NAND 12, to be executed.

Next, after the third time T3 has elapsed, the scheduling controller 15d transfers a specific command, that is, command Qc1 having a priority of "3" from the command buffer 15b to the access controller 15c, during the second time T2. Then, the command Qc1 is supplied from the access controller 15c to the NAND 12, and is executed.

After the execution time tL of the command Qc1 has elapsed since the command Qc1 was transferred, and during the first time T1 which follows the second time T2, commands Qc4 and Qc6 with a high priority in the command buffer 15b are transferred to the access controller 15c in the order of the time from the issuance. The operation is repeated in such a manner.

As described above, the scheduling controller 15d is configured to separate commands to be executed during the first time T1 and those during the second time T2. With this configuration, the commands with lower priority are executed during the second time T2, and thus it is possible to prevent the execution of a command with a low priority from being extremely delayed.

Next, the operation using the scheduling controller 15d and the throttling controller 15e will be described. When both the scheduling controller 15d and the throttling controller 15e are used, steps S16-S18 are carried out instead of steps S14 and S15 described above. That is, step S16 may be carried out immediately subsequent to step S13. As described above, the throttling controller 15e is configured to limit the number of commands which can be transferred within a certain time, that is, the fourth time T4, as shown in FIG. 4.

This specific number of commands is supplied from the throttling controller 15e to the scheduling controller 15d (S16). The scheduling controller 15d limits the number of commands which are transferred within the fourth time T4 based on this specific number.

More specifically, as shown in FIG. 6D, during the first time T1 within the fourth time T4, three commands having a priority of "1" in the command buffer 15b, namely, Qc3, Qc5, and Qc8, are transferred in the order of time from the issuance to the access controller 15c. These commands Qc3, Qc5, and Qc8 are supplied to the NAND 12, and executed (FIG. 5, S17).

Then, after the first time T1 and the third time T3 have elapsed, a command having a priority of "3" in the command buffer 15b, namely, Qc1, is transferred to the access controller 15c during the second time T2. This command Qc1 is supplied to the NAND 12 and executed (FIG. 5, S18).

As described above, the number of commands which can be transferred within the fourth time T4 is limited to four by controlling the scheduling controller 15d using the throttling controller 15e. For this reason, power consumption can be adjusted.

(Advantage)

According to the above-described embodiment, the scheduling controller 15d transfers, during the first time T1, commands with high priority from the command buffer 15b to the access controller 15c in the order of the time from the issuance, and during the second time T2, commands with low priority defined as specific commands, from the command buffer 15b to the access controller 15c. With this configuration, commands with low priority can be executed periodically. Therefore, it is possible to prevent the execution of a command with a low priority from being held in the command buffer 15b for a long time.

Moreover, the throttling controller 15e limits the number of commands which can be executed within the fourth time T4. With this configuration, the number of commands executed within a certain time can be limited by using the scheduling controller 15d and the throttling controller 15e. Therefore, it is possible to control the power consumption of the SSD 11 appropriately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
   a nonvolatile memory unit; and
   a memory controller configured to
      generate a plurality of commands in accordance with requests received from a host and store the commands in a buffer,
      set a first priority level to commands of a first type that can be executed out-of-order,
      set a second priority level to commands of a second type that should be executed in-order, the second priority level being lower than the first priority level, and
      transfer the commands having the first priority level from the buffer to the nonvolatile memory unit during a first time period, and the commands having the second priority level from the buffer to the nonvolatile memory unit during a second time period, wherein
   the first time period and the second time period are fixed time periods, and
   the second time period begins after expiration of the first time period and is shorter than the first time period.

2. The memory device according to claim 1, wherein the memory controller transfers a command having the second priority level from the buffer to the nonvolatile memory unit during the second time period even when the buffer contains one or more commands having the first priority level.

3. The memory device according to claim 1, wherein the memory controller transfers commands of a third type having a third priority level from the buffer to the nonvolatile memory unit during the first time period if the buffer does not contain any commands having the first priority level, wherein the third priority level is lower than the first priority level and higher than the second priority level.

4. The memory device according to claim 3, wherein
   the nonvolatile memory unit includes a first region that is configured to store management data and a second region that is configured to store user data,
   the commands of the first type are each a command to read from the first region, the commands of the third type are each a command to read from the second region, and
   the commands of the second type are each a command to write to either the first region or the second region.

5. The memory device according to claim 1, wherein the second time period begins a fixed time period, which is not zero, after the expiration of the first time period.

6. The memory device according to claim 1, wherein the memory controller is further configured to limit, based on a power consumption of the memory device, a total number of commands that are transferred from the buffer to the nonvolatile memory unit over a time period that spans at least one first time period and at least one second time period.

7. A method for processing requests received from a host in a memory device having a nonvolatile memory unit, the method comprising:
   generating a plurality of commands in accordance with the requests and storing the commands in a buffer of the memory device;
   setting a first priority level to commands of a first type that can be executed out-of-order;
   setting a second priority level is set to commands of a second type that should be executed in-order, the second priority level being lower than the first priority level; and
   transferring the commands having the first priority level from the buffer to the nonvolatile memory unit during a first time period, and the commands having the second priority level from the buffer to the nonvolatile memory unit during a second time period, wherein
   the first time period and the second time period are fixed time periods, and
   the second time period begins after expiration of the first time period and is shorter than the first time period.

8. The method according to claim 7, wherein a command having the second priority level is transferred from the buffer to the nonvolatile memory unit during the second time period even when the buffer contains one or more commands having the first priority level.

9. The method according to claim 7, further comprising:
   transferring commands of a third type having a third priority level from the buffer to the nonvolatile memory unit during the first time period if the buffer does not contain any commands having the first priority level, wherein the third priority level is lower than the first priority level and higher than the second priority level.

10. The method according to claim 9, wherein
    the nonvolatile memory unit includes a first region that is configured to store management data and a second region that is configured to store user data,
    the commands of the first type are each a command to read from the first region, the commands of the third type are each a command to read from the second region, and
    the commands of the second type are each a command to write to either the first region or the second region.

11. The method according to claim 7, wherein the second time period begins a fixed time period, which is not zero, after the expiration of the first time period.

12. The method according to claim 7, further comprising:
    limiting, based on a power consumption of the memory device, a total number of commands that are transferred from the buffer to the nonvolatile memory unit over a time period that spans at least one first time period and at least one second time period.

13. A memory device, comprising:
    a nonvolatile memory unit; and
    a memory controller configured to
       generate a plurality of commands in accordance with requests received from a host and store the commands in a buffer,
       set a priority level to each of the commands based on contents thereof, and
       transfer the commands having a first priority level from the buffer to the nonvolatile memory unit during a first time period, and the commands having a second priority level lower than the first priority level from the buffer to the nonvolatile memory unit during a second time period, wherein the first time period and the second time period are fixed time periods, the second time period begins after expiration of the first time period and is shorter than the first time period, and the memory controller limits, based on a power consumption of the memory device, a total number of commands that are transferred from the buffer to the nonvolatile memory unit over a time period that spans at least one first time period and at least one second time period.

14. The memory device according to claim 13, wherein the memory controller transfers a command having the second priority level from the buffer to the nonvolatile memory unit during the second time period even when the buffer contains one or more commands having the first priority level.

15. The memory device according to claim 13, wherein the memory controller transfers commands having a third priority level from the buffer to the nonvolatile memory unit during the first time period if the buffer does not contain any commands having the first priority level, wherein the third priority level is lower than the first priority level and higher than the second priority level.

16. The memory device according to claim 15, wherein the nonvolatile memory unit includes a first region that is configured to store management data and a second region that is configured to store user data, the memory controller sets the first priority level to each command to read from the first region, the third priority level to each command to read from the second region, and the second priority level to each command to write to either the first region or the second region.

17. The memory device according to claim 13, wherein the second time period begins a fixed time period, which is not zero, after the expiration of the first time period.

18. The memory device according to claim 13, wherein the memory controller sets the first priority level to commands that can be executed out-of-order, and sets the second priority level to commands that should be executed in-order.

* * * * *